(12) United States Patent
Miyahara

(10) Patent No.: US 6,753,804 B2
(45) Date of Patent: Jun. 22, 2004

(54) TARGET VEHICLE IDENTIFICATION BASED ON THE THEORETICAL RELATIONSHIP BETWEEN THE AZIMUTH ANGLE AND RELATIVE VELOCITY

(75) Inventor: Shunji Miyahara, Yokohama (JP)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/153,026

(22) Filed: May 21, 2002

(65) Prior Publication Data

US 2003/0218563 A1 Nov. 27, 2003

(51) Int. Cl.$^7$ ................................ G01S 13/93
(52) U.S. Cl. .................. 342/70; 180/167; 180/170; 701/93; 701/300; 701/301; 342/118; 342/128; 342/133; 342/147; 342/175; 342/195
(58) Field of Search .................. 180/170–179, 180/167–169; 340/435–437, 901–905; 701/93–98, 300–302; 342/70, 71, 72, 118, 119, 128–133, 145, 146, 147, 175, 195

(56) References Cited

U.S. PATENT DOCUMENTS

| | | | |
|---|---|---|---|
| 5,467,283 A | | 11/1995 | Butsuen et al. |
| 5,926,126 A | * | 7/1999 | Engelman .................... 342/70 |
| 5,964,822 A | | 10/1999 | Alland et al. |
| 6,067,031 A | * | 5/2000 | Janky et al. ................. 180/169 |
| 6,161,074 A | * | 12/2000 | Sielagoski et al. ............ 701/96 |
| 6,163,741 A | | 12/2000 | Matsuda et al. |
| 6,202,027 B1 | | 3/2001 | Alland et al. |
| 6,230,093 B1 | | 5/2001 | Michi et al. |
| 6,256,574 B1 | * | 7/2001 | Prestl et al. ................... 701/96 |
| 6,259,985 B1 | | 7/2001 | Sielagoski et al. |
| 6,268,804 B1 | * | 7/2001 | Janky et al. ................. 180/169 |
| 6,301,542 B1 | | 10/2001 | Kirchberger et al. |
| 6,304,811 B1 | | 10/2001 | Prestl |
| 6,311,123 B1 | * | 10/2001 | Nakamura et al. ............ 701/96 |
| 6,317,679 B2 | | 11/2001 | Sielagoski et al. |
| 6,348,889 B1 | | 2/2002 | Ashihara et al. |
| 6,353,788 B1 | * | 3/2002 | Baker et al. ................... 701/96 |
| 6,363,311 B1 | | 3/2002 | Kuroda et al. |
| 6,459,983 B1 | * | 10/2002 | Lichtenberg et al. ......... 701/96 |
| 6,496,770 B2 | * | 12/2002 | Winner et al. ................. 701/96 |

FOREIGN PATENT DOCUMENTS

| | | |
|---|---|---|
| EP | 1243457 A2 | 9/2002 |
| EP | 1323570 A1 | 7/2003 |

* cited by examiner

*Primary Examiner*—Bernarr E. Gregory
(74) *Attorney, Agent, or Firm*—Brinks Hofer Gilson & Lione

(57) ABSTRACT

A method for tracking a target vehicle through a curve in a roadway is disclosed. The method includes measuring an azimuth angle between the target vehicle and a host vehicle, calculating a relative velocity between the target vehicle and the host vehicle, developing a theoretical relationship, wherein the relationship is a function of the measured azimuth angle and the measured relative velocity, and comparing the developed theoretical relationship with measured relationship between the azimuth angle and the relative velocity. Further, the target vehicle is determined to be in the same lane or path of the host vehicle by evaluating how well the developed theoretical relationship fits the with the measured azimuth angle and calculated relative velocity. Therefore, the present invention determines the path of a target vehicle without relying on inaccurate conventional methods based on the yaw rate of the host vehicle.

23 Claims, 12 Drawing Sheets

TARGET VEHICLE IDENTIFICATION BASED ON THE THEORETICAL RELATIONSHIP BETWEEN THE AZIMUTH ANGLE AND RELATIVE VELOCITY

TECHNICAL FIELD

The present invention relates to automotive vehicle speed control systems and to such systems that track a target vehicle through a curve.

BACKGROUND

Adaptive cruise control (ACC) systems are gaining wide spread acceptance in the automotive industry. Adaptive cruise control systems utilize a conventional cruise control system, which maintains a desired vehicle speed. In addition, the adaptive cruise control system can modify the speed of the vehicle to accommodate for changes in the traffic conditions. The ACC system accomplishes this through automatic acceleration, deceleration and/or braking. Thus, the vehicle having the ACC (host vehicle) maintains a safe distance from the vehicle driving in front (target vehicle) of the host vehicle as a function of road speed.

Typically prior art adaptive cruise control systems include an adaptive cruise control processor, a radar sensor, a brake intervention system, a display unit, an engine intervention system, a plurality of sensors (i.e., wheel speed, yaw rate, steering wheel angle, lateral acceleration), and a transmission intervention system. Generally, the radar sensor operates at a frequency of 76 to 77 (GHz), which was specifically allocated for ACC system. In operation, a radar beam is emitted from the host vehicle and is reflected from the target vehicle back toward the host vehicle. An analysis of the emitted and reflected radar waves is conducted to determine propagation time, Doppler shift, and amplitude of the waves for pulse radar, and beat frequency and Doppler shift for FMCW radar. From this analysis, the distance, relative speed and relative azimuth angle with respect to the host vehicle is calculated.

One significant problem for the ACC to overcome is to ensure reliable operation of the system in varying situations such as entering curves in the road or lane changes. For proper system operation, it is essential that the target vehicle is correctly identified and the lane change and curve-enter/-exit are distinguished from each other. Prior art systems obtain information typically from a yaw rate sensor, a steering wheel angle sensor, a wheel speed sensor, and typically a lateral speed sensor to determine the target vehicle's lane location and curve status. Other systems under consideration for determining vehicle location on a roadway are video imaging systems.

The problem of determining the target vehicle's lane location becomes more complex when the target vehicle has entered a curve and the host vehicle has not yet entered the curve or vice versa. Prior art methods using steering angle and yaw rate information do not properly address this transient condition. Thus, when the host vehicle is following a target vehicle that has entered a curve, the ACC sometimes loses the target, especially when the host vehicle is on a straight course and the target vehicle enters the curve. Essentially, prior art systems do not effectively judge whether the target vehicle is in the same lane as the host vehicle or whether the host vehicle has entered the curve or vice versa. Specifically, the situation in which the target vehicle enters the curve may be confused with the situation in which the target vehicle changes lanes.

Therefore, what is needed is a new and improved method for determining whether a target vehicle has entered a curve or whether the target vehicle has changed lanes. This new method should accurately predict the location of the target vehicle with only host vehicle and radar information, and does not require extensive experimental data for adaptation of parameters. Moreover, the new method for tracking the target vehicle should prevent the loss of the target vehicle as the target vehicle enters and exits a curve in a roadway.

SUMMARY

In an aspect of the present invention a method for determining whether a target vehicle is in the path of the host vehicle is provided. The method includes using an azimuth angle and calculating relative velocity between a target vehicle and a host vehicle at a predefined time interval. Further, a determination of whether a target vehicle is in the same lane as the host vehicle (in the path of the host vehicle) is evaluated. The candidate target vehicle having the shortest range is then identified. However, if there is no candidate vehicle then other preceding target vehicles are identified. Again, if the preceding vehicle is identified, the vehicle having the shortest range relative to the host is determined to be the primary target vehicle. A curve is fit to the measured data using the following theoretical relationship:

$$\theta = (R/2L)(vr/V)^2$$

$$\theta = -(R/2L)(vr/V - L/R)^2 + L/2R$$

where:
V=velocity of host vehicle;
r=the absolute value of the relative velocity;
θ=the azimuth angle; and
vri=the absolute value of the measured relative velocity.

After a curve $(Y = a1\,X + a2\,X^2)$ is fit to the measured data (xi, yi)=(vri/V, θ), the following equations are used to determine whether the target vehicle is entering or exiting a curve. If for example, equation: $|\sigma a2/a2| < \delta$ (16) where $\sigma_{a2}$ is standard deviation of the regression coefficient a2 and δ=0.25 or other appropriate predefined value, is satisfied then one of the target vehicle and host vehicle is determined to be on a curve. It is then determined whether the following equation: $|a1/a2| << L/|R|$ where: R is the radius of curvature estimated from the regression and L is the range between the host and target vehicle, is satisfied. If equation is satisfied the target vehicle is determined to be at the entrance of a curve. However, if the equation is not satisfied, then the target vehicle is determined to be at the exit of the curve.

These and other aspects and advantages of the present invention will become apparent upon reading the following detailed description of the invention in combination with the accompanying drawings.

DESCRIPTION

Figure 1:
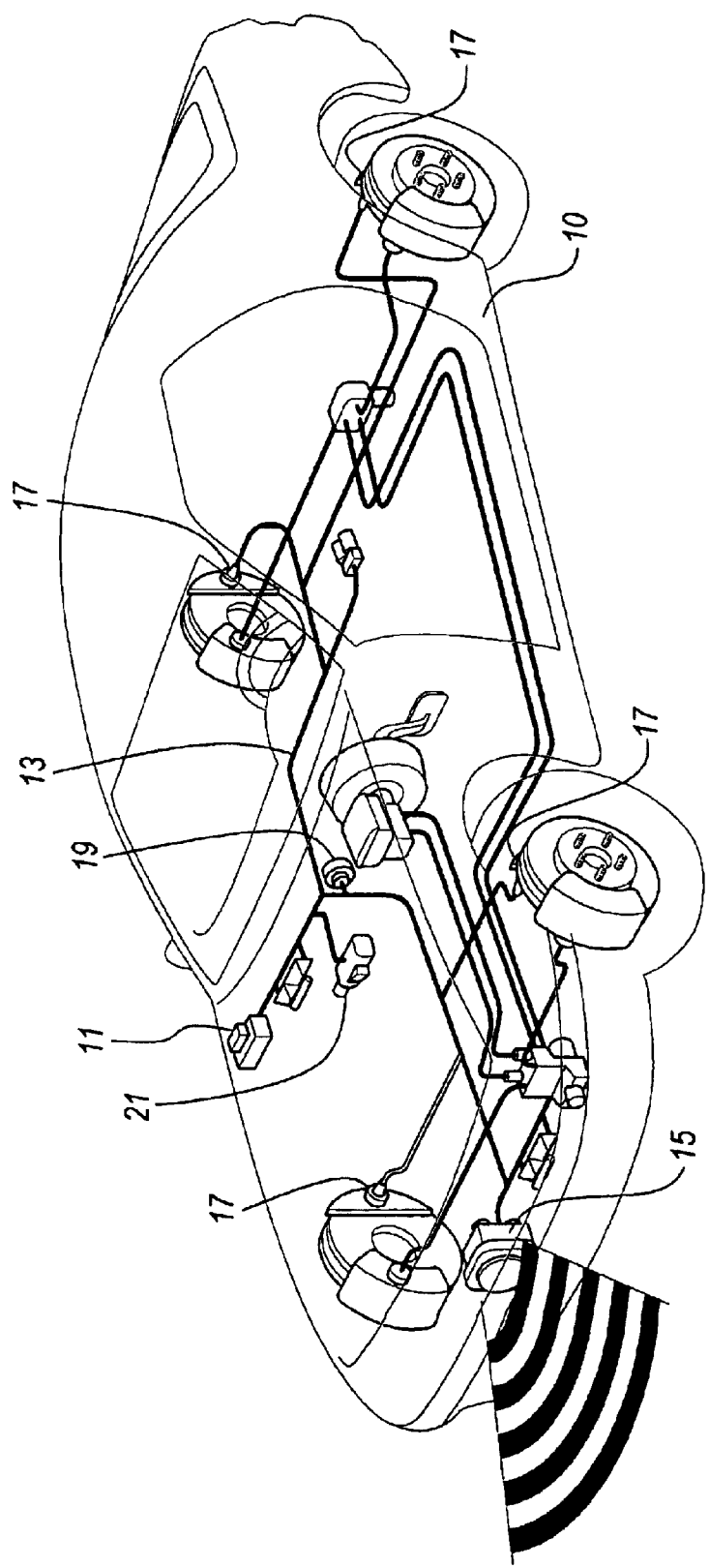
FIG. 1 is a perspective view of a host vehicle equipped with an adaptive cruise control (ACC) system, in accordance with the present invention.

Referring now to FIG. 1, a perspective view of a host vehicle 10 having an adaptive cruise control (ACC) system is illustrated, in accordance with the present invention. Host vehicle 10 generally includes an ACC control module 11 coupled to a communication network 13, such as a CAN network. Control module 11 typically has an electronic memory coupled to a processor for storing and executing ACC program code. Generally, control module 11 of the ACC receives signals from various sensors, including a radar sensor 15 or other proximity sensor for determining an azimuth angle (θ) and the absolute value of a relative velocity (vr) between the host vehicle and the target vehicle. Further, a plurality of wheel speed sensors 17 provide signals indicative of wheel speed to network 13. Other sensors in communication with network 13 are provided such as a steering wheel angle sensor 19 for determining the steering wheel angle, and a yaw rate sensor 21 for determining the yaw rate of host vehicle 10. The information derived for the above mentioned sensors will be utilized in a control algorithm or method for determining the target vehicle's location, as will be described in more detail below.

Figure 2:
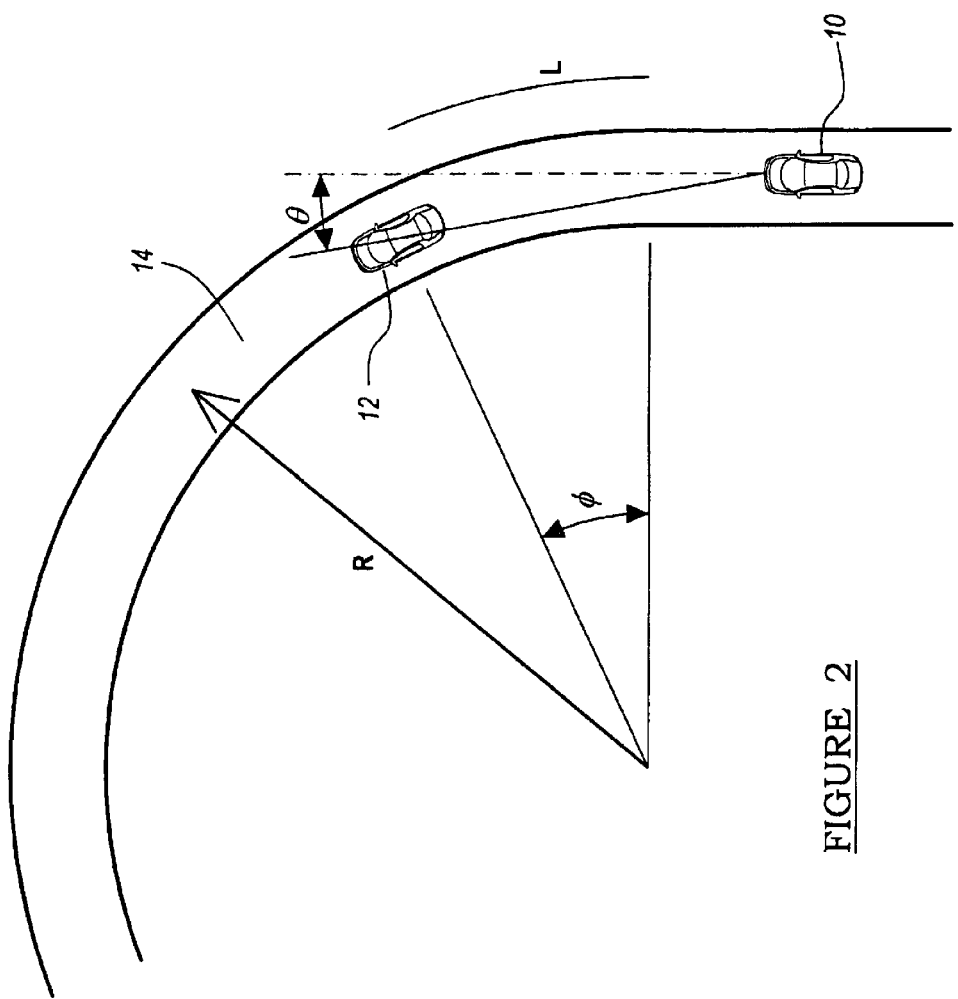
FIG. 2 is a plan view of a host vehicle tracking a target vehicle through a curve in a roadway, in accordance with the present invention.

Referring now to FIG. 2, a host vehicle 10 having an ACC is shown following or tracking a target vehicle 12 through a curve 14, in accordance with the present invention. A typical curve 14 in a roadway 16 will have a radius of curvature "R". The location of the target vehicle 12 along curve 14 is described by the radius of curvature "R" and the angle φ. The angle φ represents the angle between the entrance of the curve and the current location of target vehicle 12.

Figure 3:
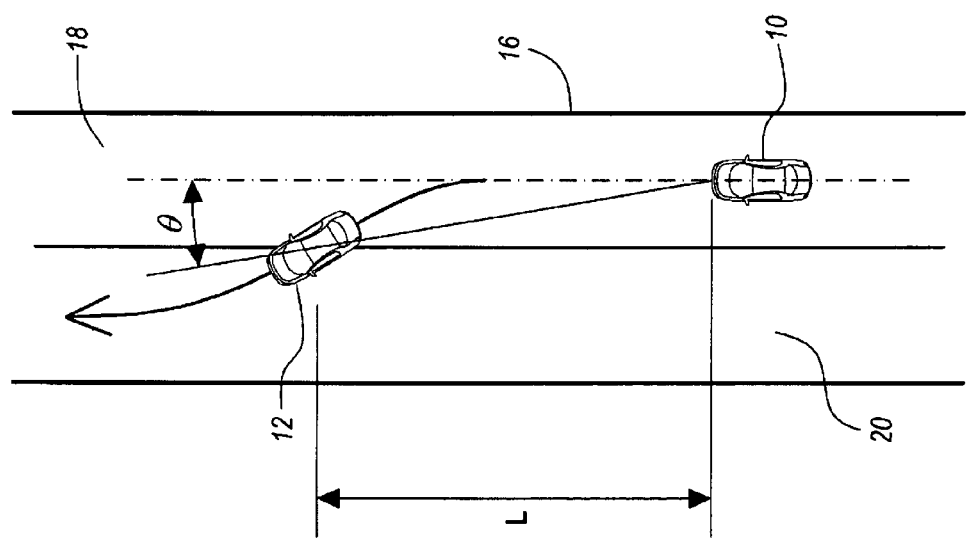
FIG. 3 is a plan view of a host vehicle tracking a target vehicle, wherein the target vehicle is changing lanes, in accordance with the present invention.

A method of the present invention distinguishes between two scenarios, firstly where the target vehicle has entered or exited a curve and secondly where the target vehicle has changed lanes. The second case is shown in FIG. 3. A roadway 16 includes two lanes 18 and 20, and as illustrated, target vehicle 12 is moving from lane 18 to lane 20 while the host vehicle 10 remains in lane 18. Prior art methods have not been able to accurately determine whether target vehicle 12 is changing lanes or is entering a curve in a roadway.

Figure 4:
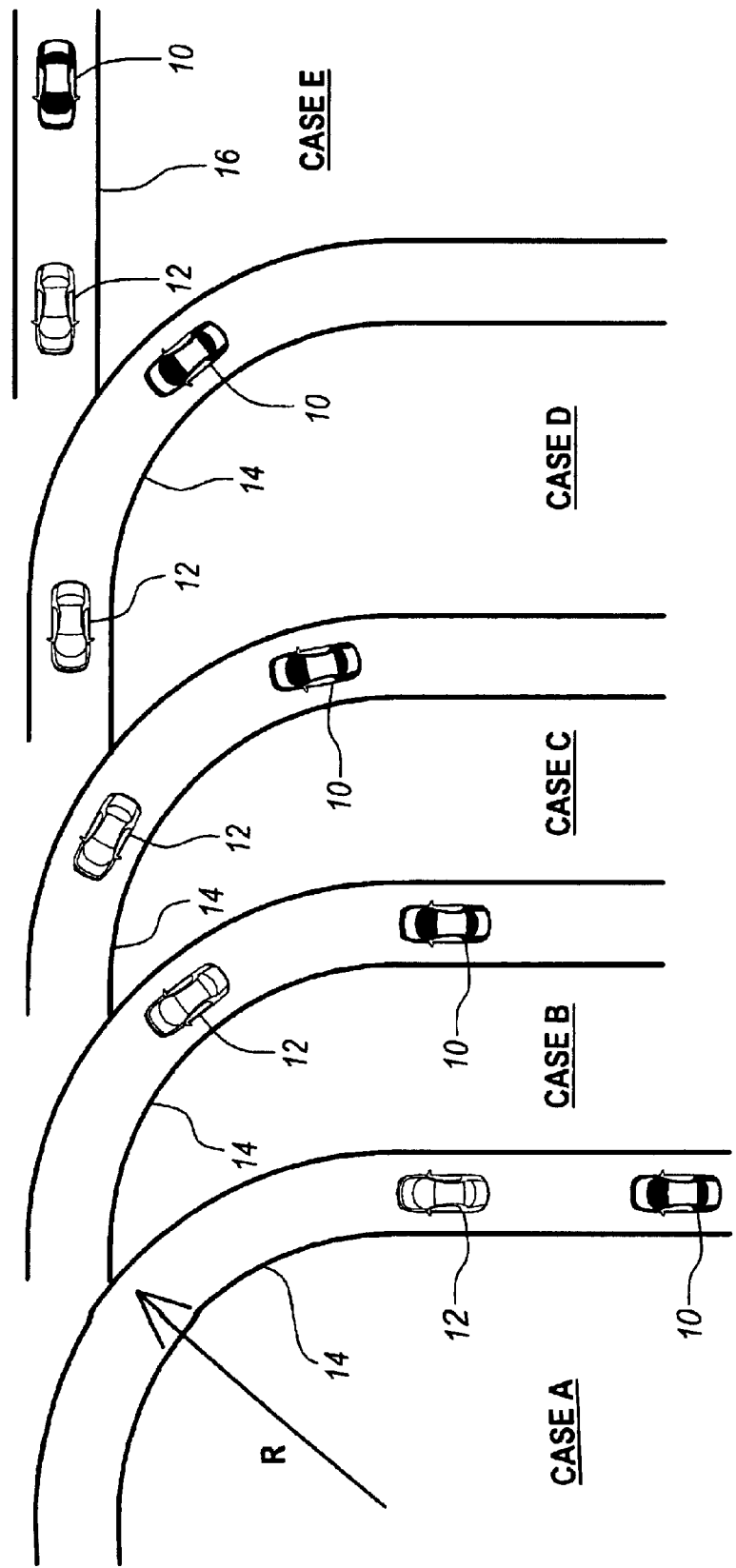
FIG. 4 is a plan view illustrating the host vehicle and target vehicle through a curve in a roadway.

More specifically, there are five cases, as illustrated in FIG. 4, which describe the transitional scenarios of host vehicle 10 and target vehicle 12 traveling through a curve 14 in a roadway 16. Of these five cases, case A (where the target vehicle 12 and host vehicle 10 have not entered the curve) and case E (where the target vehicle 12 and the host vehicle 10 have exited the curve), pose no significant problem in identifying the location of target vehicle 12. Similarly, case C is easily identifiable by estimating the radius of curvature "R" of curve 14 using yaw rate and/or steering wheel angle information of the host vehicle (as known in the art) and identifying whether the target vehicle is in the same lane as the host vehicle. However, prior art methods have not been able to identify the location of the target vehicle in cases B and D, because yaw rate and/or steering wheel angle information is not useful to determine the lane location of the target vehicle in these transitional scenarios.

Figure 5:
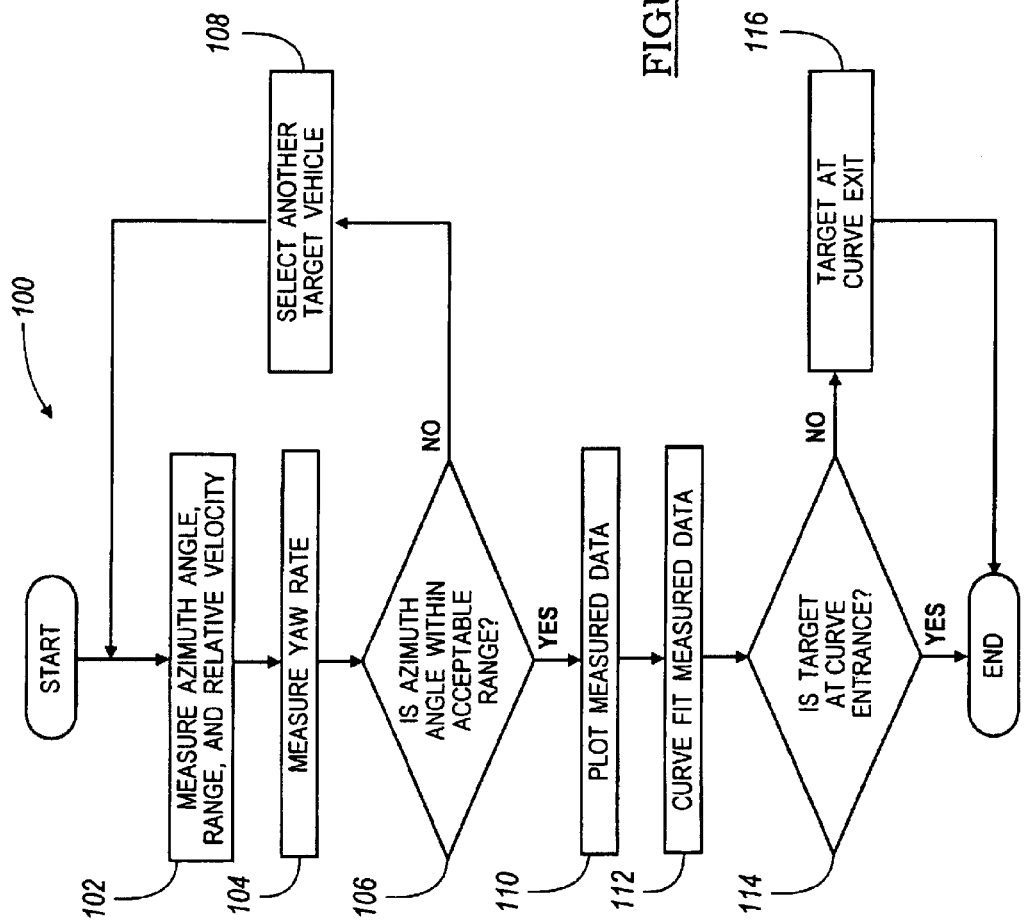
FIG. 5 is flowchart illustrating a method for determining whether target vehicle is entering a curve, exiting a curve, or changing lanes.

Referring now to FIG. 5, a method 100 for determining whether target vehicle 12 is entering a curve, exiting a curve, or changing lanes, will now be described. The method of the present invention utilizes a time independent phase chart of the azimuth angle (θ) of the target vehicle relative to the bore site of the host vehicle and the absolute value of the relative velocity (vr) between the target (or preceding vehicle) and the host vehicles (shown in FIG. 6d). In an aspect of the present invention, a theoretical relationship or equation between the azimuth angle and the absolute relative velocity of the target vehicle with respect to the host vehicle is developed for the transient periods of case B and case D of FIG. 4.

In operation, method 100 of the present invention compares the observed target (or preceding) vehicle traces with a derived theoretical relationship. The comparison is performed by first measuring the azimuth angle and relative velocity between the host vehicle and the target vehicle, as represented by block 102. From the difference between the observed and theoretical relationship it may be determined whether the target vehicle is entering the curve, exiting the curve, or changing lanes, as will become more clear below. Furthermore, the method of the present invention discriminates between target and non-target vehicles.

Figure 6C:
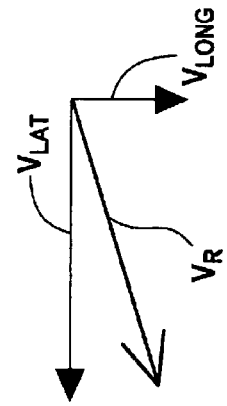
FIGS. 6a–6c are vector diagrams illustrating the relative velocity (Vr) between the target and host vehicle and the lateral and longitudinal components of the relative velocity.
Figure 6B:
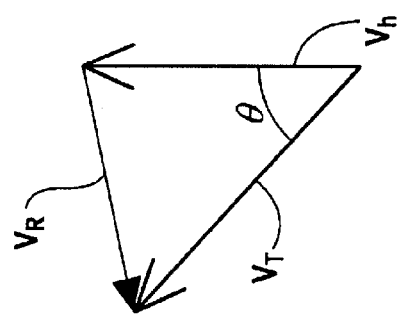
Figure 6A:
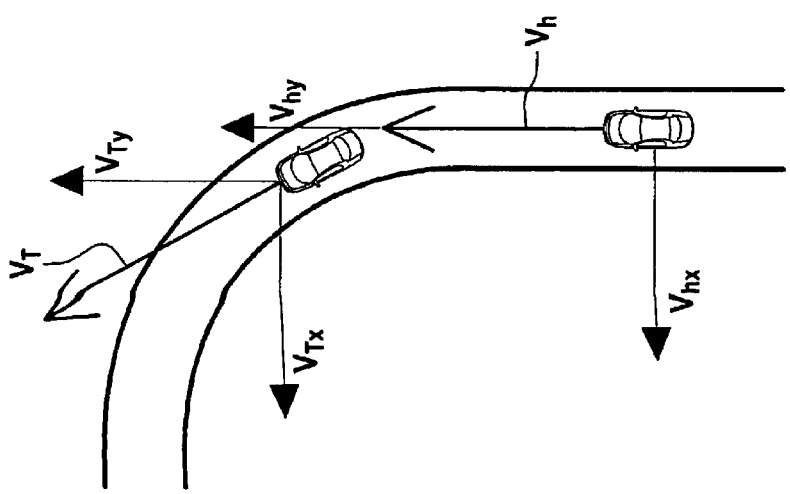

With reference to FIGS. 6a–6c the relative velocity (Vr) between the target and host vehicle is illustrated. The Vr is calculated by considering the velocity vector of the host vehicle (Vh) and the velocity vector of the target vehicle (Vt). More specifically, the following equation is used to calculate the relative velocity (Vr):

$$Vr = SQRT[(V_{tx} - V_{hx})^2 + (V_{ty} - V_{hy})^2]$$

Where:

$V_{tx}$ = the x component of velocity Vt;
$V_{ty}$ = the y component of velocity Vt;

$V_{hx}$=the x component of velocity Vh; and $V_{hy}$=the y component of velocity Vh.

After the relative velocity is calculated the lateral ($V_{lat}$) and longitudinal ($V_{long}$) components of the relative velocity may be obtained by applying well know geometry and trigonometry principles. The azimuth angle θ as previously mentioned is measured using radar sensor 15. The present invention contemplates using the lateral component ($V_{lat}$) of the relative velocity (Vr) in place of the absolute value of the relative velocity.

Figure 6D:
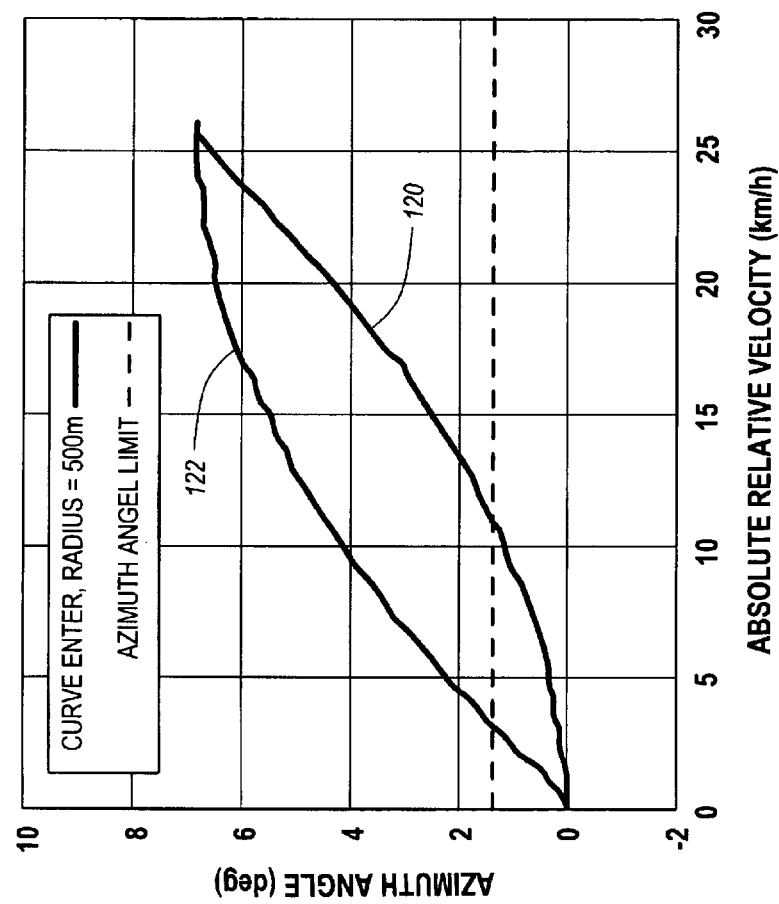
FIG. 6d is graph illustrating a time dependent phase chart of the azimuth angle (θ) of the target vehicle relative to the bore site of the host vehicle and the absolute value of the relative velocity (vr) between the target and the host vehicles.

The theoretical relationship between the azimuth angle and relative velocity is described by equation (1) below for curve entry, referenced by line 120 in FIG. 6*d*, and equation (2) or (2') below for curve exit, referenced by line 122 in FIG. 6*d*. The quadratic equations, shown below, are used to curve fit the measured data (relative velocity Vri and azimuth angle θi) to determine the radius of curvature "R". The ratio L/R where L represents the distance the target vehicle is from the entrance of the curve (see FIG. 2) is also determined from the measured data.

$$\theta = (R/2L)(vr/V)^2 \quad (1)$$

$$\theta = -(R/2L)(vr/V - L/R)^2 + L/2R \quad (2)$$

$$\theta = -(R/2L)(vr/V + L/R)^2 + L/2R \quad (2')$$

where:

V=velocity of host vehicle;

vr=the absolute value of the relative velocity;

θ=the azimuth angle; and vri=the absolute value of the measured relative velocity.

θi=the measured azimuth angle.

Figure 7B:
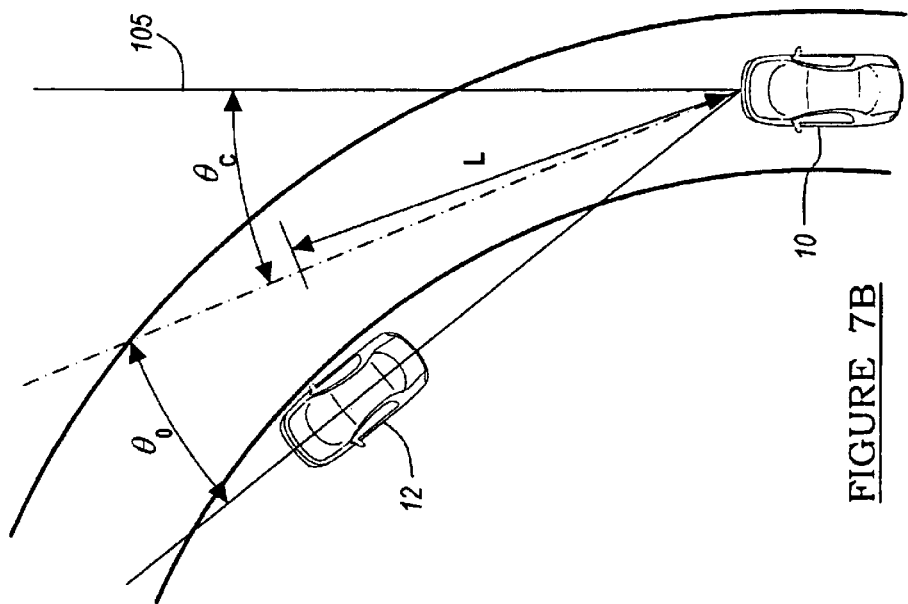
FIG. 7b is a graph illustrating the azimuth angle limit on the curve.
Figure 7A:
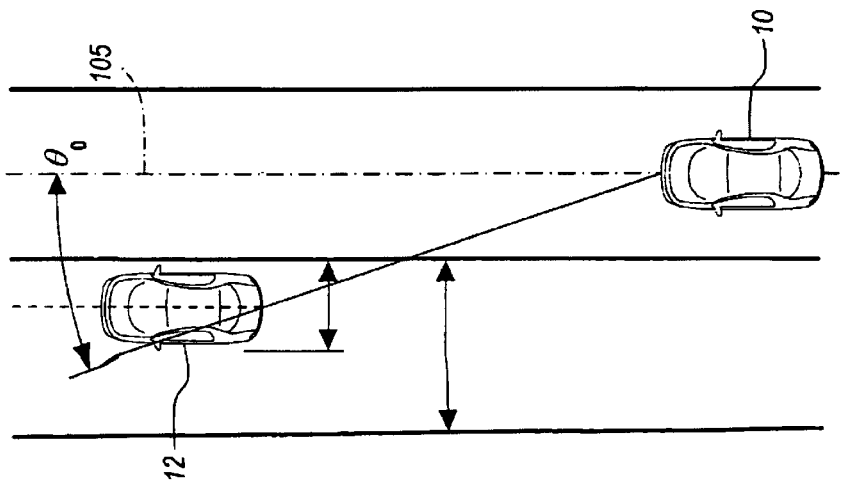
FIG. 7a is a graph illustrating the azimuth angle limit on the straight lane.

At block 104, the yaw rate of the host vehicle is measured. The path of the target vehicle is estimated using yaw rate, range, and azimuth angle. An azimuth angle limit $\theta_0$, which is a predefined angle, is compared with equation (3) below, as represented by block 106. The azimuth angle limit $\theta_0$ is illustrated in FIGS. 7*a* and 7*b*. If equation (3) is satisfied, the preceding vehicle is determined to be a candidate target vehicle.

$$|\theta - \theta_c| < 2 \text{ or } 3 \times \theta_0 \quad (3)$$

where:

θ=the measured azimuth angle between the host and preceding vehicles;

$\theta_c$=the azimuth angle between a line 105, parallel with the direction the host vehicle is heading, and the center of the host vehicle's lane at a distance L.

A candidate target vehicle is a vehicle that would be desirable for the host vehicle to track or follow. However, if equation (3) is not satisfied, then the preceding vehicle is not a candidate target vehicle and is no longer desirable to be tracked or followed by the host vehicle. Thus, another vehicle would be selected, as represented by block 108. Once an acceptable candidate vehicle has been selected, the measured azimuth angle (shown in FIG. 9*a*) and calculated relative velocity (shown in FIG. 9*a*) data are plotted, as represented by block 110.

Figure 8A:
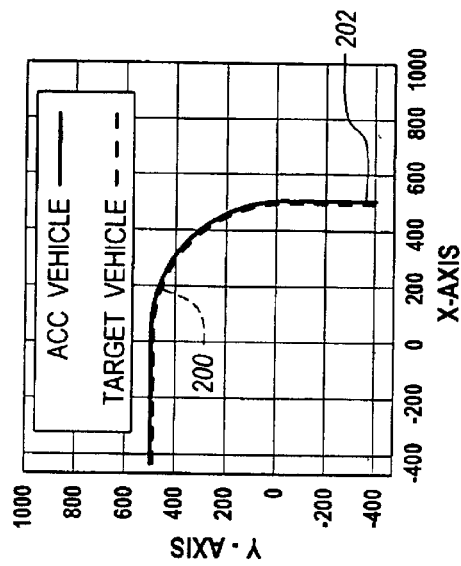
FIG. 8a is a graph illustrating the host and target vehicles in the same lane and traveling through a curve.
Figure 8B:
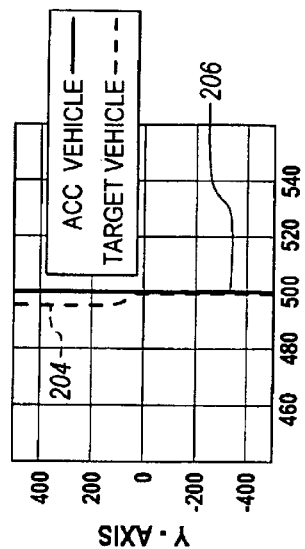
FIG. 8b is a graph illustrating the host vehicle traveling straight and the target vehicle changing lanes.
Figure 9A:
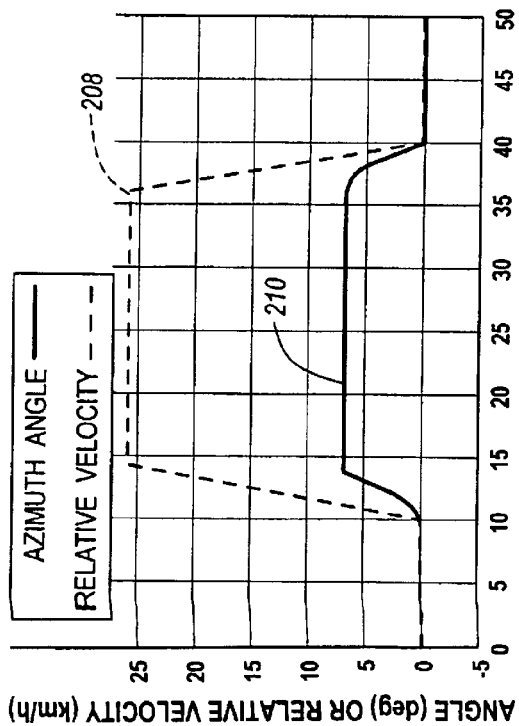
FIG. 9a is a graph illustrating the target and host vehicles entering a curve wherein the azimuth angle progressively increases until both vehicles are in the curve and then progressively decreases until both vehicles are out of the curve.

FIG. 8*a* illustrates the situation where the host and target vehicles are in the same lane and are traveling through a curve. The trace or line 200 of the target vehicle is plotted against the trace or line 202 of the host vehicle. As illustrated, the target vehicle and host vehicle are following the same path or course. However, as shown in FIG. 8*b*, the target vehicle has changed lanes and is described by a new path 204 that deviates from path 206 of the host vehicle. In the scenario where the target and host vehicles are entering a curve, the azimuth angle progressively increases until both vehicles are in the curve and then progressively decreases until both vehicles are out of the curve, as illustrated in FIG. 9*a* by line 210.

Figure 9B:
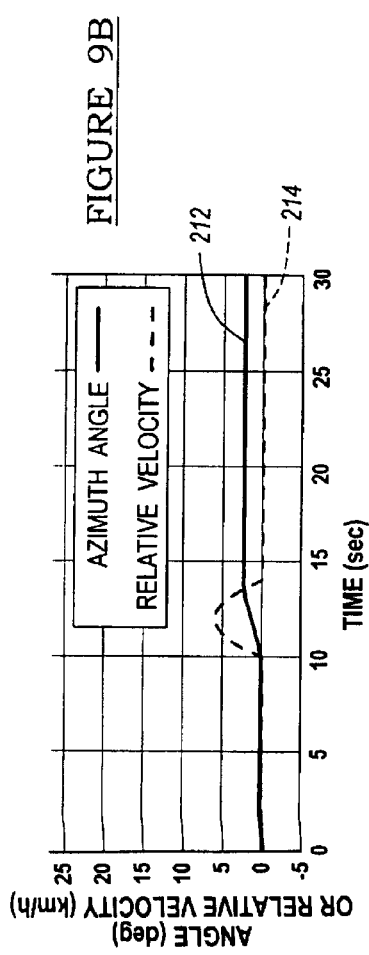
FIG. 9b is a graph illustrating the target vehicle changing lanes and the azimuth angle rises and then remains constant as depicted by the curve and then the relative velocity rises, peaks, and then falls until the target vehicle has completed its lane change.

Whereas, in the case of the target vehicle changing lanes, the azimuth angle rises and then remains constant, as depicted by line 212 in FIG. 9*b*, and the relative velocity, as depicted by line 214, rises, peaks, and then falls until the target vehicle has completed its lane change.

With continuing reference to FIG. 5, at block 112, the plotted data (azimuth angle vs absolute relative velocity) is fit with quadratic equations (1) and (2) shown above, and alternatively represented by equation (4) below.

$$Y = a0 + a1\,X + a2\,X^2 \quad (4)$$

where:

y=Azimuth angle;

x=absolute relative velocity divided by the host vehicle velocity;

$a_1$ and $a_2$=regression constants.

Since a0, in this particular application, is not present the above equation simplifies to $$Y = a1\,X + a2\,X^2 \quad (5)$$

The following equations describe how the regression constants a1 and a2 are obtained.

$$W \times \underline{A} = \underline{Y} \quad (6)$$

$$\begin{pmatrix} \sum X_i^2 & \sum X_i^3 \\ \sum X_i^3 & \sum X_i^4 \end{pmatrix} \times \begin{pmatrix} a1 \\ a2 \end{pmatrix} = \begin{pmatrix} \sum Y_i * X_i \\ \sum Y_i * X_i^2 \end{pmatrix} \quad (7)$$

$$\begin{pmatrix} X2 & X3 \\ X3 & X4 \end{pmatrix} \times \begin{pmatrix} a1 \\ a2 \end{pmatrix} = \begin{pmatrix} YX \\ YX2 \end{pmatrix} \quad (8)$$

$$Y_1: N(\mu_i, \sigma^2) \quad (9)$$

$$a2 = (X2*YX2 - X3*YX)/det \quad (10)$$

$$det = X2*X4 - X3*X3 \quad (11)$$

$$a2 = \sum (X2/det) X_i^2 * Y_i + \sum (X3/det) X_i * Y_i \quad (12)$$
$$= \sum \{(X2/det) X_i^2 + (X3/det) X_i\} * Y_i.$$

The standard deviations are described by:

$$\sigma_{a2}^2 = \sum \{(X2/det) X_i^2 + (X3/det) X_i\}^2 * \sigma^2 \quad (13)$$

$$\sigma^2 = \sum (Y_i - a1\,X_i - a2\,X_i^2)2/(n-2) \quad (14)$$

Preferably $$|\sigma_{a2}/a2| < 0.25 \quad (15)$$

After a curve is fit to the measured data, at block 112, the following equations are used to determine whether the target vehicle is entering or exiting a curve. If for example, equation: $|\sigma a2/a2| < \delta$ (16) where δ=0.25 or other appropriate predefined value, is satisfied then the target vehicle is determined to be on a curve. At block 114 it is determined whether the following equation: $|a1/a2| \ll L/|R|$ (17) where: R is the radius estimated from the regression and L is the range between the host and target vehicle, is satisfied. If equation (17) is satisfied the target vehicle is determined to be at the entrance of a curve. However, if the equation (17) is not satisfied, then the target vehicle is determined to be at the exit of the curve as represented by block 116.

Figure 9C:
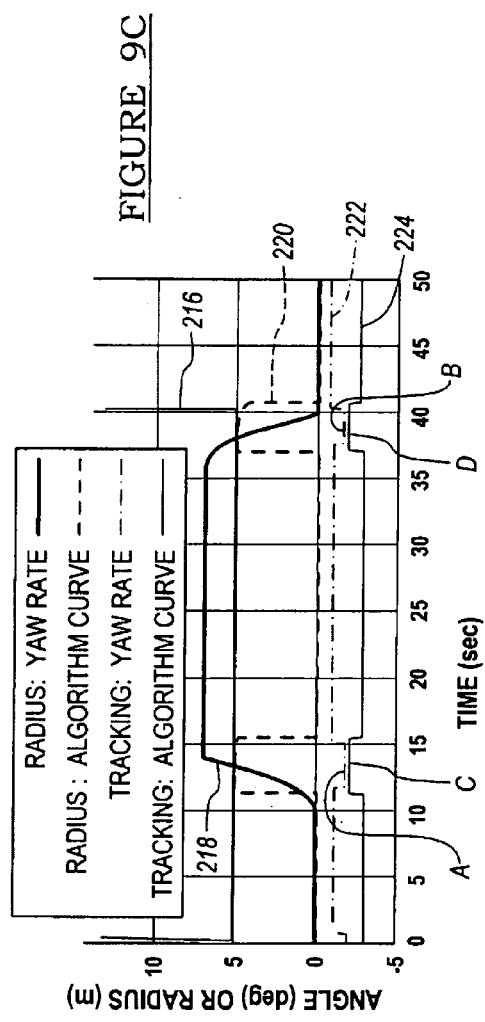
FIG. 9c is a plot of azimuth angle over time where the host and target vehicles are traveling through a curve.
Figure 9D:
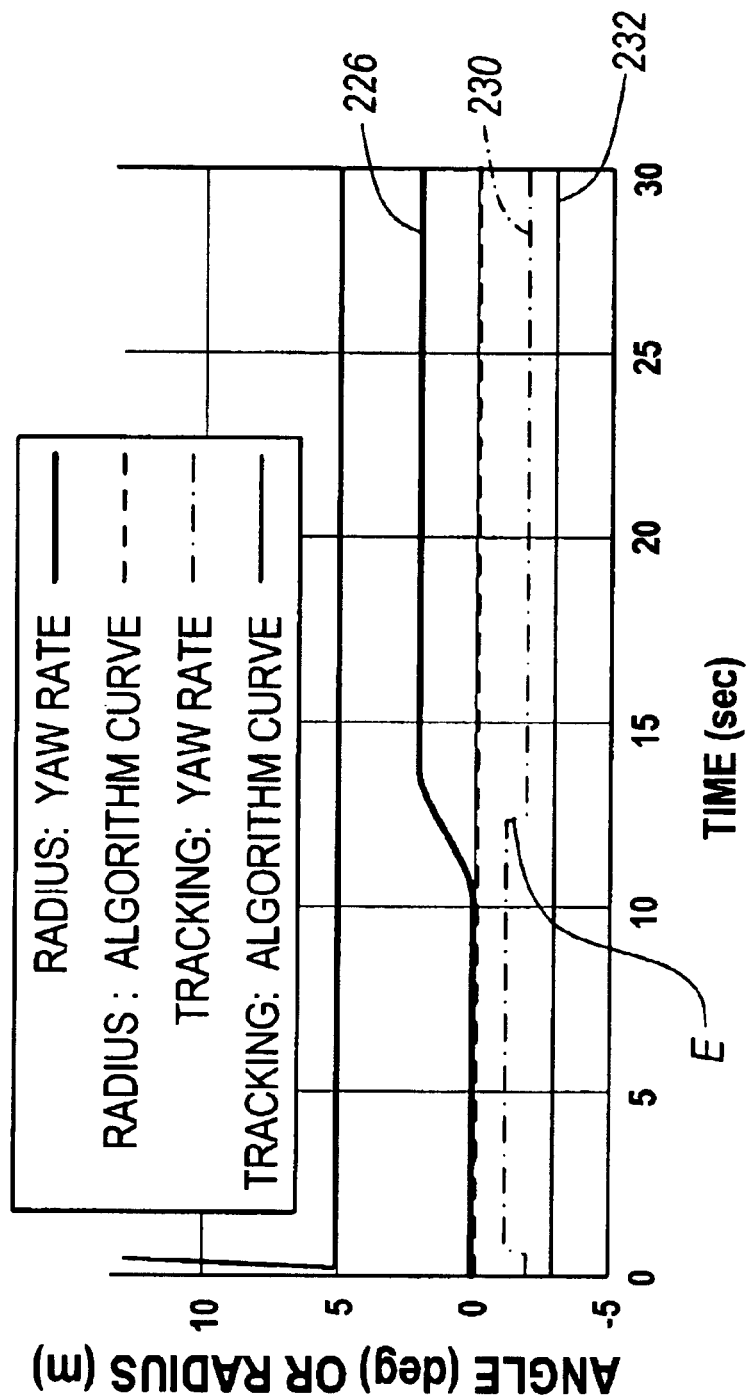
FIG. 9d is a plot of azimuth angle over time where the target vehicle is changing lanes.

Referring now to FIGS. 9c and 9d, a plot of azimuth angle over time is illustrated where the host and target vehicles are traveling through a curve, and where the target vehicle is changing lanes, respectively. As shown in FIG. 9c, azimuth angle, referenced by line 218, rises initially when the target vehicle is entering the curve and the host vehicle has not yet entered the curve. Further, line 222 is plotted and represents the output of an algorithm that is based on yaw rate to determine target vehicle location. In contrast, the output of the method of the present invention for determining target vehicle location in a curve is plotted and represented by line 224. At region A and B in line 222, the yaw rate method for determining the path of the target vehicle indicates that the target vehicle is out of the host vehicle's path. But this judgment is wrong.

Similarly, the method of the present invention indicates at region C in line 224 that the target vehicle is entering the curve and at region D in line 224, that the target vehicle is exiting the curve. Thus, the method of the present invention identifies the target in the transient situations.

As represented by line 226 in FIG. 9d (lane change), the azimuth angle between the host and target vehicles increases and then remains constant during a target vehicle lane change. Line 232 represents the output of the method of the present invention for determining target vehicle location. The output remains low. Namely, the method of the present invention does not respond to the lane change. As illustrated by transition E in line 230, the prior art method which utilizes yaw rate to determine target vehicle location indicates that the target vehicle is turning. In contrast, the algorithm or method of the present invention as represented by output line 232 does not indicate that the target vehicle is turning (i.e. changing lanes and/or entering or exiting a curve). Therefore, the method of the present invention is able to distinguish a target vehicle lane change from the target vehicle entering or exiting a curve in a road.

In another aspect of the present invention a curvature of a road is estimated from the relative velocity and azimuth angle between a target vehicle and a host vehicle. This estimation is determined during a transient period, where the target vehicle is entering or exiting a curve or transitioning from one curve to another curve having different radii of curvature. This aspect of the present invention incorporates and expands on the embodiments and other aspects of the invention previously described. For example, the previous embodiments address the situation where the target vehicle is transitioning from a straight portion of a road to a curved portion of the road or from a curved portion of a road to a straight portion of a road. The instant embodiment addresses this situation by treating the straight portion of the road as a curve having an infinite radius.

Figure 10B:
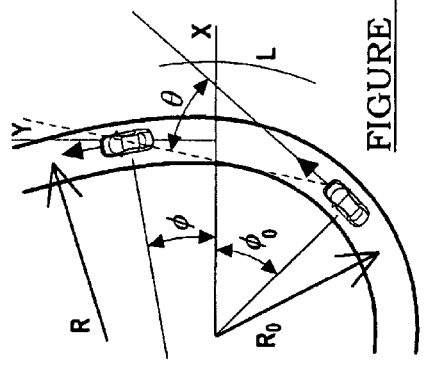
FIGS. 10a, 10b and 11a is a diagram illustrating the host and the target vehicles traveling along a road having multiple curves and wherein the curves have different radii of curvature.
Figure 11B:
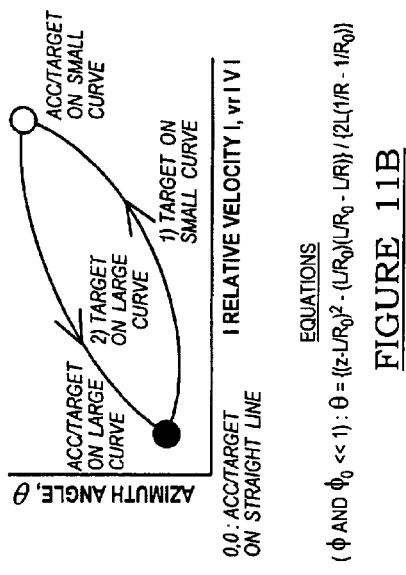
FIG. 11b is a phase chart illustrating the relationship between azimuth angle and relative velocity when the host and the target vehicles are traveling along a road having multiple curves and wherein the curves have different radii of curvature.
Figure 10A:
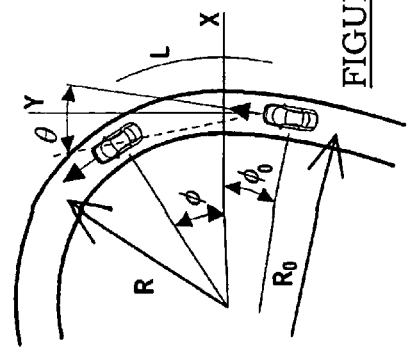
Figure 11A:
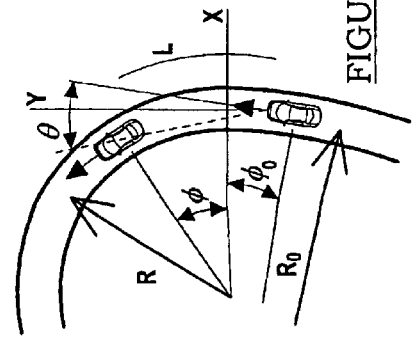

With reference to FIG. 10, the target vehicle's position (xt, yt) and host vehicle position (xh, yh) are described by the following relationships:

$(xt, yt)=(-R(1-\cos \phi), R \sin \phi)$ (21)

$(xh, yh)=(-R_0(1-\cos \phi_0), -R_0 \sin \phi_0)$ (22)

$L=R\phi+R_0 \phi_0$ (23)

where:
- $R_0$=the radius of the first curve the target vehicle enters;
- R=the radius of the second curve the target vehicle enters;
- L=path length between the target vehicle and the host vehicle;
- $\phi_0$=angle between the host vehicle and transition point from the first curve to the second curve; and
- $\phi$=angle between the transition point from the first curve to the second curve and the target vehicle.

R, $R_0$, $\phi$ and $\phi_0$ are positive for the left turn and they are negative for right turn. $R_0\phi_0$ and $R\phi$ are always non-negative. The azimuth angle (in radians, counter-clockwise) is described by equation (24) below:

$\theta=\tan^{-1}\{(R \cos \phi_0 - R \cos(\phi+\phi_0)+R_0(1-\cos \phi_0))/(-R \sin \phi_0 + R \sin(\phi+\phi_0)+R_0 \sin \phi_0)\}$ (24)

The relative velocity is given by equations (25) through (29) below:

$(vtx, vty)=V(-\sin \phi, \cos \phi)$ (25)

$(vhx, vhy)=V(\sin \phi_0, \cos \phi_0)$ (26)

$(vrx, vry)=(vtx-vhy, vty-vhy)=V(-\sin \phi - \sin \phi_0, \cos \phi - \cos \phi_0)$ (27)

$$vr = (vrx^2 + vry^2)^{1/2}$$
$$= V(2 + 2\sin\phi\sin\phi_0 - 2\cos\phi\cos\phi_0)^{1/2}$$ (28)

$$= V(2 - 2\cos(\phi + \phi_0))^{1/2}$$
$$= 2V\sin((\phi + \phi_0)/2)$$ (29)

where:
V=the absolute value of the velocity of host and target vehicles.

Assuming that $\phi$ and $\phi_0$ are small enough, that is that the range (L) is much smaller than the radius (R), then $\phi$ and $\phi_0$ are approximated by equations (28) and (29) shown below.

$\sin \phi \approx \phi$ and $\sin \phi_0 \approx \phi_0$ (28)

$\cos \phi \approx 1-\phi^2/2$ and $\cos \phi_0 \approx 1-\phi_0^2/2$ (29)

The azimuth angle ($\theta$) and the relative velocity (vr) are approximated by equations (30) and (31) shown below.

$\theta=(R(1-\phi_0^2/2)-R(1-(\phi+\phi_0)^2/2)+R_0 \phi_0^2/2)/(-R \phi_0 + R(\phi+\phi_0)+R_0 \phi_0)$ $\theta=(R\phi(\phi+\phi_0)+L\phi_0)/2L$ (30)

$vr=V(\phi+\phi_0)$ (31)

Thus, the relationships simplify to:

$R\phi+R_0\phi_0=L$ (23')

$\phi+\phi_0=vr/V=z$ (31')

Combining equations (23'), (31'), and (32), equations (33) and (34) are obtained (as shown below).

$$\phi = (z - L/R_0)R_0/(R_0 - R)$$ (32)

$$\phi_0 = -(z - L/R)R/(R_0 - R)$$ (33)
$$= -(1/R_0)(z - L/R)/(1/R - 1/R_0)$$

$R\phi=-(L/R_0-z)/(1/R-1R_0)$ (34)

Substituting equations (31'), (33) and (34) into equation (30) yields:

$$\theta = \{(z - L/R_0)z - (L/R_0)(z - L/R)\}/(2L(1/R - 1/R_0)) \quad (35)$$
$$= \{(z - L/R_0)^2 - (L/R_0)(L/R_0 - L/R)\}/\{2L(1/R - 1/R_0)\}$$
$$= \{z^2 + (-2L/R_0)z + L^2/R_0R\}/\{2L(1/R - 1/R_0)\}. \quad (36)$$

The methodology described above may be applied to any set of measured date, such as, relative velocity and azimuth angle measurements. The applied quadratic regression relationship is expressed by equation (37) for a given data set $(X_i, Y_i)$.

$$Y = a0 + a1\, X + a2\, X^2 \quad (37)$$

Coefficients a0, a1, and a2 may be determined by utilizing a matrix W and vectors $\underline{A}$ and $\underline{Y}$ as shown in equation (38), (39) and (40).

$$W\underline{A} = \underline{Y} \quad (38)$$

$$\begin{pmatrix} n & \sum X_i & \sum X_i^2 \\ \sum X_i & \sum X_i^2 & \sum X_i^3 \\ \sum X_i^2 & \sum X_i^3 & \sum X_i^4 \end{pmatrix} \begin{pmatrix} a0 \\ a1 \\ a2 \end{pmatrix} = \begin{pmatrix} \sum Y_i \\ \sum Y_i * X_i \\ \sum Y_i * X_i^2 \end{pmatrix} \quad (39)$$

$$\begin{pmatrix} X0 & X1 & X2 \\ X1 & X2 & X3 \\ X2 & X3 & X4 \end{pmatrix} \begin{pmatrix} a0 \\ a1 \\ a2 \end{pmatrix} = \begin{pmatrix} Y \\ YX \\ YX2 \end{pmatrix} \quad (40)$$

Where $X_i$ and $Y_i$ are measured data (i.e. absolute value of relative velocity divided by host vehicle velocity and azimuth angle). Coefficients, a0, a1 and a2, are calculated from equation (40). Since the curvature of the road estimation is based on coefficient a2, the error of a2 is evaluated. A variance of $Y_i$ is assumed, as shown in equation (41) below:

$$Y_i: N(\mu_i, \sigma^2) \quad (41)$$

From equation (40), a2 is expressed by equation (42).

$$a2 = (X0 * X2 * YX2 + X1 * X3 * Y + x2 * X1 * YX - \quad (42)$$
$$X2 * X2 * Y - X1 * X1 * YX2 - X0 * X3 * YX)/det$$

Where: $det = X0 * X2 * X4 + X1 * X3 * X2 + X2 * X3 * X1 - \quad (43)$
$$X2 * X2 * X2 - X1 * X1 * X4 - X0 * X3 * X3.$$

$$a2 = \sum \{(X0 * X2 - X1 * X1)/det\} X_i^2 * Y_i + \quad (44)$$
$$\sum \{(X2 * X1 - X0 * X3/det)\} X_i * Y_i +$$
$$\sum \{(X1 * X3 - X2 * X2/det)\} Y_i$$
$$= \sum \{(X0 * X2 - X1 * X1) X_i^2 +$$
$$(X2 * X1 - X0 * X3) X_i + (X1 * X3 - X2 * X2)\} Y_i / det$$

The variance of a2 is given by equation (45):

$$\sigma_{a2}^2 = \sum \{(X0 * X2 - X1 * X1) X_i^2 + (X2 * X1 - X0 * X3) X_i + (X1 * X3 - X2 * X2)\}^2 / det^2 \sigma^2 \quad (45)$$

The variance of $Y_1$ is estimated by equation (46).

$$\sigma^2 = \sum (Y_i - a0 - a1 X_i - a2 X_i^2)^2 / (n - 3) \quad (46)$$

If equation (47) is satisfied, the estimation of a2 is judged to be correct and therefore, the curve defined by equation (37) is determined to be an accurate estimation of the curvature of the road:

If equation (47) is satisfied, the estimation of a2 is judged to be correct and therefore, the curve defined by equation (37) is determined to be an accurate estimation of the curvature of the road:

$$|\sigma a2/a2| < 0.25 \quad (47)$$

or $$|\sigma_R/R| < 0.25. \quad (48)$$

Accordingly, the present invention has many advantages and benefits over the prior art methods for determining target vehicle location on a roadway. For example, the method or algorithm of the present invention is able to distinguish between target vehicle lane changes and target vehicle entrance into a curve. Moreover, the present invention provides a method for determining whether the target vehicle is entering a curve or exiting curve. Thus, the present invention is a dramatic improvement over prior art methods which utilize yaw rate and other vehicle parameters to determine target vehicle location in a roadway.

As any person skilled in the art of automotive vehicle speed control systems will recognize from the previous detailed description and from the figures and claims, modifications and changes can be made to the preferred embodiments of the invention without departing from the scope of this invention defined in the following claims.

What is claimed is:

1. A method for tracking a target vehicle through 8 curve In a roadway, the roadway having a lane in which the target vehicle travels, the method comprising:

measuring a range and an azimuth angle between the target vehicle and a host vehicle;

calculating a relative velocity between the target vehicle and the host vehicle from the measured range, azimuth angle, host vehicle velocity and host vehicle lateral acceleration;

comparing the measured azimuth angle and the calculated relative velocity to a predefined mathematical relationship; and determining whether the target vehicle Is in the lane the host vehicle is in by evaluating how well the predefined mathematical relationship fits the measured azimuth angle and the calculated relative velocity.

2. The method of claim 1 wherein the predefined mathematical relationship is a quadratic equation, wherein the quadratic equation is a function of the azimuth angle and the relative velocity, and wherein the measured range is much smaller than a radius of curvature of the curve in the roadway.

3. The method of claim 2 wherein the azimuth angle is a dependent variable and relative velocity is an independent variable.

4. The method of claim 2 wherein the relative velocity is one of an absolute value of the relative velocity and a lateral relative velocity.

5. The method of claim 1 further comprising evaluating a standard deviation to determine how well the predefined mathematical relationship fits the measured azimuth angle and calculated relative velocity.

6. The method of claim 5 wherein evaluating a standard deviation further comprises determining whether the following relationship is satisfied:

$$|\sigma R/R| < \text{a predefined criteria},$$

where:
$\sigma R$ = a standard deviation between the predefined mathematical relationship and the measured azimuth angle and calculated relative velocity; and
R = a radius of curvature of the curve.

7. The method of claim 6 wherein the predefined criteria Is approximately 0.25.

8. The method of claim 5 wherein evaluating a standard deviation further comprises determining whether the following relationship is satisfied:

$$=\sigma a2/a2| < \text{a predefined criteria}$$

where:
$\sigma^a 2$ = a standard deviation between the predefined mathematical relationship and the measured azimuth angle and calculated relative velocity; and
a2 = a coefficient of the predefined mathematical relationship.

9. The method of claim 8 wherein the predefined criteria is approximately 0.25.

10. The method of claim 1 further comprising determining an azimuth angle limit to identify a candidate target vehicle for the host vehicle to track.

11. The method of claim 10 wherein determining an azimuth angle limit further comprises determining whether the measured azimuth angle is 2 times a previously measured azimuth angle.

12. The method of claim 10 wherein determining an azimuth angle limit further comprises determining whether the measured azimuth angle is 3 times a previously measured azimuth angle.

13. A method for tracking a target vehicle through a curve in a roadway, the roadway having a lane in which the target vehicle travels, the method comprising:
measuring a range and an azimuth angle between the target vehicle and a host vehicle;
calculating a relative velocity between the target vehicle and the host vehicle from the measured range, azimuth angle, host vehicle velocity and host vehicle lateral acceleration;
determining an azimuth angle limit to determine if the target vehicle is a candidate target vehicle;
comparing the measured azimuth angle and the calculated relative velocity to a predefined mathematical relationship; and
determining whether the candidate target vehicle is in the lane the host vehicle is in by evaluating how well the predefined mathematical relationship fits the measured azimuth angle and the calculated relative velocity.

14. The method of claim 13 wherein the predefined mathematical relationship is a quadratic relationship, wherein the quadratic relationship is a function of the azimuth angle end the relative velocity, and wherein the measured range is much smaller than a radius of curvature of the curve the roadway.

15. The method of claim 13 wherein the azimuth angle is a dependent variable and relative velocity is an independent variable.

16. The method of claim 13 wherein the relative velocity is one of an absolute value of the relative velocity and a lateral relative velocity.

17. The method of claim 13 further comprising evaluating a standard deviation to determine how well the measured azimuth angle and calculated relative velocity fit the predefined mathematical relationship.

18. The method of claim 17 wherein evaluating a standard deviation further comprises determining whether the following relationship is satisfied:

$$|\sigma R/R| < \text{a predefined criteria}$$

where:
$\sigma R$ = a standard deviation between the predefined mathematical relationship and the measured azimuth angle and calculated relative velocity, and
R = a radius of curvature of the curve.

19. The method of claim is wherein the predefined criteria is approximately 0.25.

20. The method of claim 17 wherein evaluating a standard deviation further comprises determining whether the following relationship is satisfied:

$$|\sigma a2/a2| < \text{a predefined criteria}$$

where; $\sigma a2$ a standard deviation between the predefined mathematical relationship and the measured azimuth angle and calculated relative velocity, and
a2 = a coefficient of the predefined mathematical relationship.

21. The method of claim 20 wherein the predefined criteria is 0.25.

22. The method of claim 13 wherein determining an azimuth angle limit further comprises determining whether the measured azimuth angle is 2 times a previously measured azimuth angle.

23. The method of claim 13 wherein determining an azimuth angle limit further comprises determining whether the measured azimuth angle is 3 times a previously measured azimuth angle.

* * * * *

UNITED STATES PATENT AND TRADEMARK OFFICE
CERTIFICATE OF CORRECTION

PATENT NO. : 6,753,804 B2
DATED : June 22, 2004
INVENTOR(S) : Shunji Miyahara

It is certified that error appears in the above-identified patent and that said Letters Patent is hereby corrected as shown below:

Title page,
Item [57], ABSTRACT,
Line 12, delete "fits the with the" and substitute -- fits the -- in its place.

Column 10,
Line 41, before "roadway," delete "In a" and substitute -- in a -- in its place.
Line 52, after "vehicle" delete "Is" and substitute -- is -- in its place.

Column 11,
Line 23, before "approximately" delete "Is" and substitute -- is -- in its place.
Line 27, delete "=σα2 / α2 | < α" and substitute -- |σα2 / α2 | <α -- in its place.

Column 12,
Line 11, after "angle" delete "end" and substitute -- and -- in its place; and
Line 13, after "curve" insert -- in --.
Line 35, after "method of claim" insert -- 18 --.
Line 41, delete "σa2 a" and substitute -- σa2 = a -- in its place.

Signed and Sealed this

Twenty-eighth Day of December, 2004

JON W. DUDAS
*Director of the United States Patent and Trademark Office*